Figure 1:
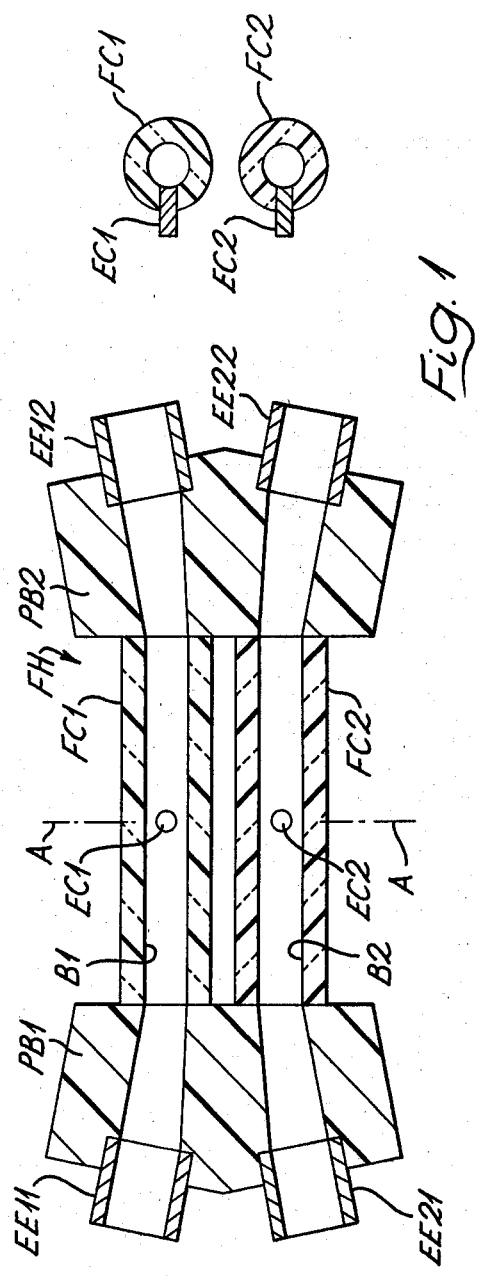

United States Patent [19]

Gray et al.

[11] 4,351,189
[45] Sep. 28, 1982

[54] DIFFERENTIAL FLOWMETERS

[75] Inventors: John O. Gray, Wilmslow; Michael L. Sanderson, Stockport, both of England

[73] Assignee: National Research Development Corporation, London, England

[21] Appl. No.: 177,392

[22] Filed: Aug. 12, 1980

[30] Foreign Application Priority Data

Aug. 17, 1979 [GB] United Kingdom ............... 7928804

[51] Int. Cl.³ .............................................. G01F 1/58
[52] U.S. Cl. ................................. 73/196; 73/861.15; 73/861.16; 137/101.19
[58] Field of Search ............... 73/196, 861.12, 861.15, 73/861.16, 861.13; 137/101.19

[56] References Cited

U.S. PATENT DOCUMENTS

| | | | |
|---|---|---|---|
| 2,637,207 | 5/1953 | De Boisblanc | 73/861.15 |
| 2,685,796 | 8/1954 | Romanowski et al. | 73/861.12 |
| 2,771,771 | 11/1956 | Kamp et al. | 73/861.12 |
| 3,002,379 | 10/1961 | Hurley | 73/861.15 X |
| 3,036,585 | 5/1962 | Shawhan | 73/196 X |
| 3,438,385 | 4/1969 | Nogami | 137/101.19 |
| 4,112,515 | 9/1978 | Sandow | 137/101.19 X |

OTHER PUBLICATIONS

Gray and Sanderson–"Electromagnetic Differential Flowmeter," I.E.E. Electronics Letters, vol. 6, No. 7 (1970), pp. 194–196.

*Primary Examiner*—Charles A. Ruehl
*Attorney, Agent, or Firm*—Cushman, Darby & Cushman

[57] ABSTRACT

A flowmeter head is in the form of side-by-side channels of non-magnetic, electrically insulating material with the channels of very similar size. Sufficient precision of channel size is attained by boring the channels or by using drawn tube of closely controlled size. A radial electrode is provided in each channel, e.g. by drilling a fine hole in the channel wall and sealing a wire in. The electrode arrangement permits an applied magnetic flux to pass through first one channel, then the other. Earth electrodes are provided at the ends of each channel. An earth-loop free connection to a differential amplifier of a flowmeter apparatus is possible with the electrode configuration. The precision of the channel size improves common-mode accuracy and the earth-loop free connection reduces drift and noise.

12 Claims, 4 Drawing Figures

U.S. Patent  Sep. 28, 1982  Sheet 1 of 3  4,351,189

DIFFERENTIAL FLOWMETERS

This invention relates to devices in which liquids flow through adjacent flow paths to permit measurement or comparison of the liquid flow rates. Such devices are referred to as differential flowmeters as they are frequently used for comparing flows requiring a set relation such as one to one or where the flows are an inflow and an outflow which are to be kept in balance or exactly equal.

Many forms of differential flowmeters have been devised for a wide range of uses with varying degress of precision and complexity of operation. However in certain uses for example dialysis, liquid flow measurement and precise mixing control, accuracies in excess of 1 part in 1,000 are required without great expense and complex equipment.

One form of electromagnetic differential flowmeter and electronic measurement techniques have been described by J. O. Gray and M. L. Sanderson in I.E.E. Electronics Letters, Vol. 6, No. 7 (1970) p 194 and in Paper E - 2 of the "Conference on Fluid Flow Measurement in the Mid-1970's" NEL 8, 8—10 Apr. 1975. These papers describe fabricated rectangular flowmeter heads and associated circuits having accuracies of better than 1 part in 1,000 and approaching 1 part in 10,000 of the flow in a channel (the common mode flow). Such flowmeters provide in themselves a significant advance but still require skilled operation and frequent testing and checking to ensure consistent measurement.

The fabrication techniques make construction to an accuracy suitable for the measurement accuracy very expensive.

It is an object of the invention to provide an economic liquid flowmeter which has a consistent accuracy suitable for the above uses.

According to the invention there is provided an electromagnetic flowmeter head having a structure of separate liquid flow channels and measuring electrodes the head structure including in inert, non-magnetic insulating material two pairs of inlet and outlet ports linked by respective channel walls providing substantially identical liquid flow channels held close together with a path for magnetic flux across the channels, each said inlet and outlet having an individual earthing electrode outside the flux path position and each channel having a pick-up electrode of substantially non-magnetic material extending through the channel wall to the channel periphery whereby in operation an earth-loop free electrode connection circuit is available substantially identical for each channel.

For precision the liquid flow channels may be bored circular holes in appropriate bore wall materials such as acrylic plastics, quartz or glass. The channels may be of drawn quartz tube of adequate precision. Preferably the path for magnetic flux is through one bore then the other. Desirably the pick-up electrodes are small compared with the channel size. Typically for a channel of some 1.8 mm diameter in 3 mm acrylic plastics (PERSPEX, RTM) or some 3 mm diameter in 7 mm heat-resistant glass (VERIDIA, RTM) the electrodes are no more than 0.5 mm in diameter and preferably about 0.2 mm in diameter as radial leads. Conveniently for such diameters the channels are between 10 and 100 mm long with inlet and outlet ports augmenting the length to about 30 to 150 mm overall. The port electrodes are then similar stainless steel tubular stubs about 3 to 25 mm long.

A differential flowmeter arrangement including such a head as described above includes a magnetic field source providing a controllable alternating magnetic field for said flux path and indicating means including a differential amplifier responsive to outputs from said pick-up electrodes, with an earth connection to said port electrodes, on the flow of conductive liquid through the flux path in each channel thereby to indicate flow difference or equality.

The arrangement may provide differential flow measurements or flow ratio measurements on fluid flows through the channels.

Advantageously this arrangement can be substantially independent of conductivity differences between the liquids in each channel.

Figure 2:
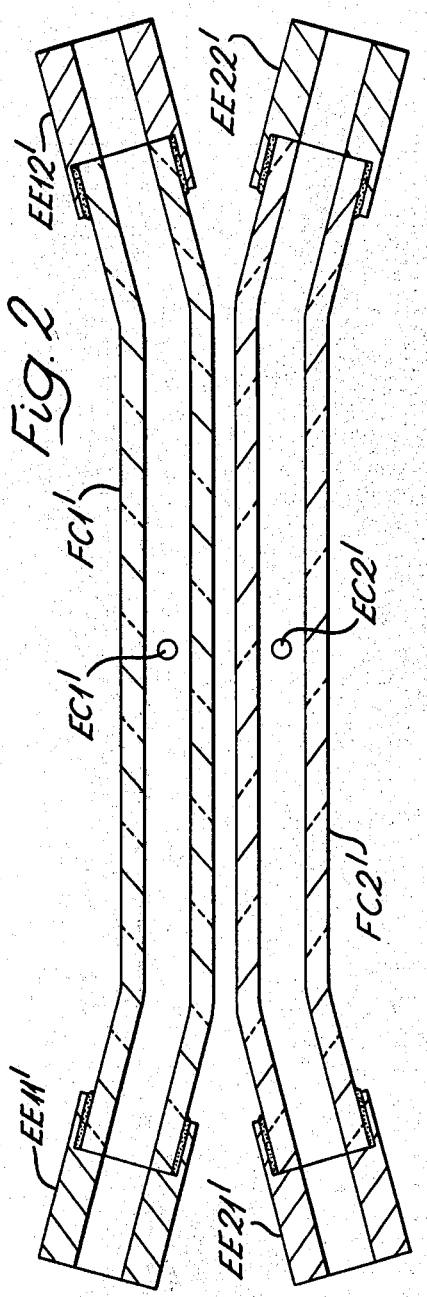
Figure 3:
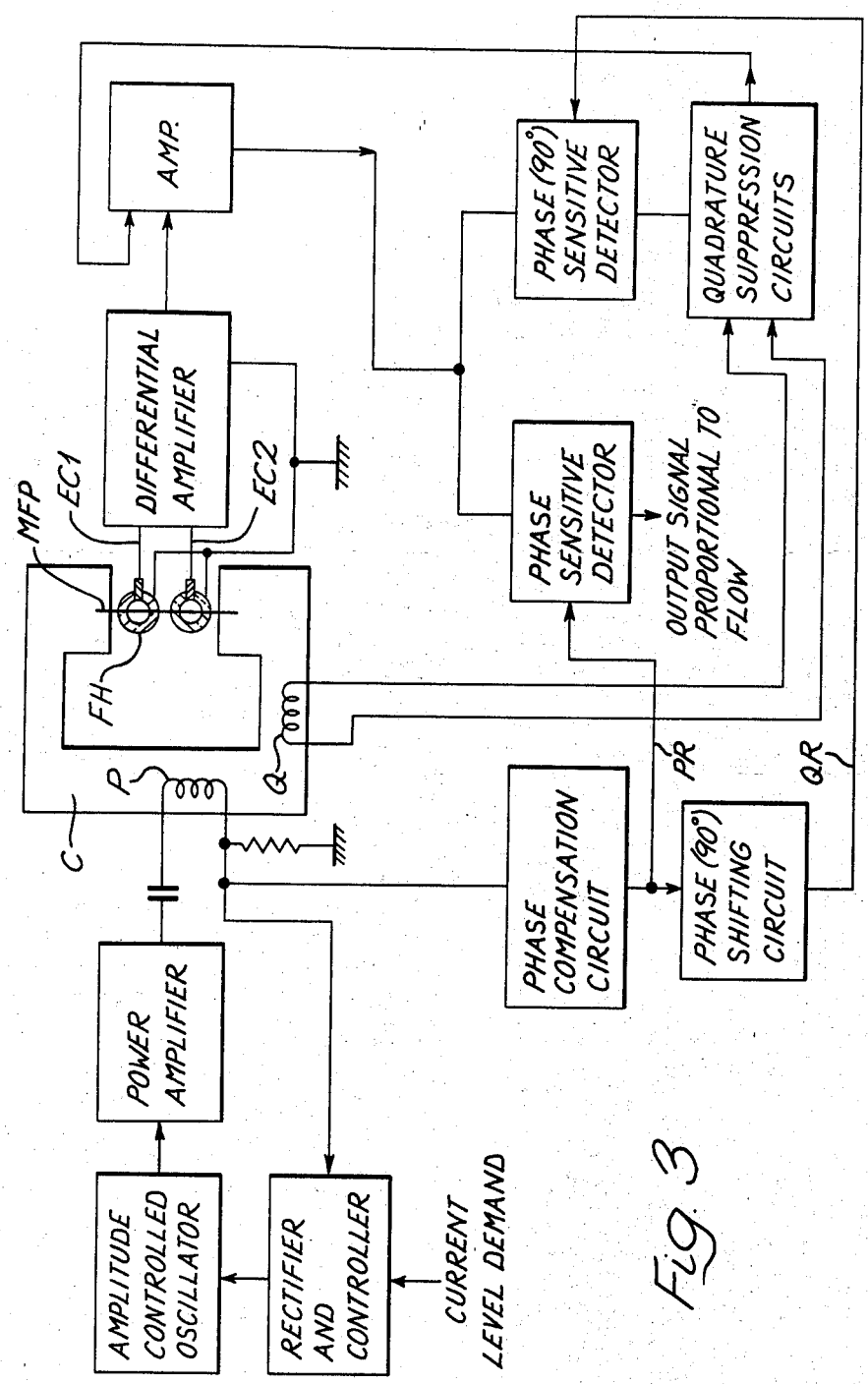
Figure 4:
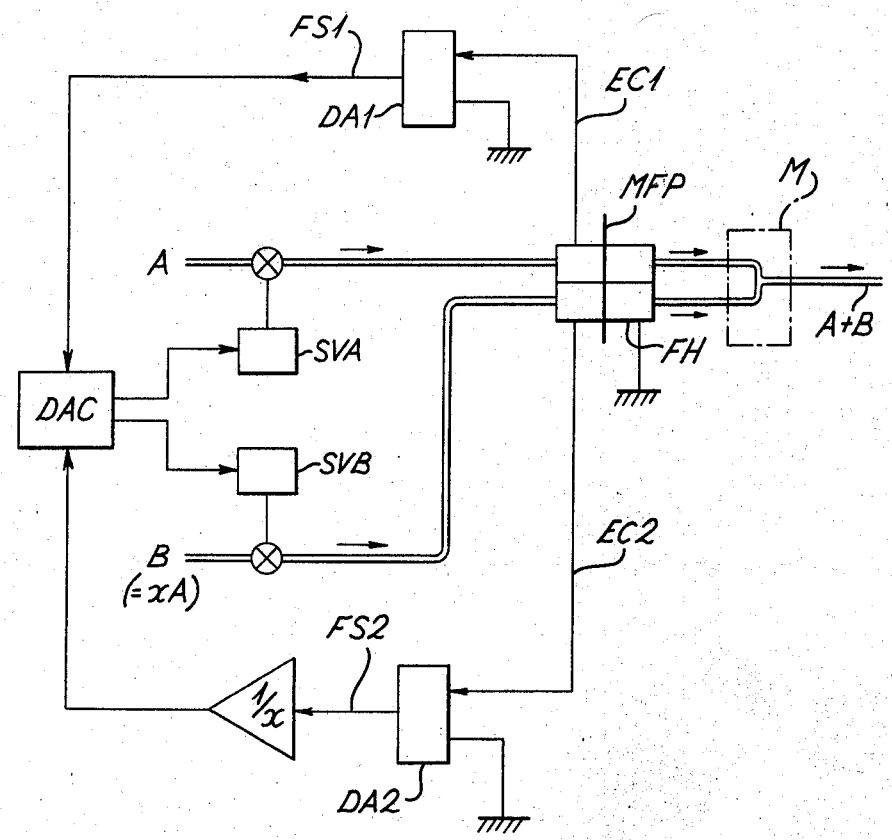

Embodiments of the invention will now be described with reference to the accompanying drawings in which, FIG. 1 shows an axial cross-section, with a scrap sectional view of a flowmeter head embodying the invention, FIG. 2 shows another head embodying the invention, FIG. 3 shows a block schematic circuit diagram of a flowmeter arrangement usable with the head of FIG. 1, and FIG. 4 shows an outline of a circuit to control dilution and/or mixing of liquids.

FIG. 1 shows a cross-section of a flowmeter head with a body made of a non-magnetic insulating material with electrodes of non-magnetic material. Conveniently the body is of acrylic plastics such as PERSPEX (RTM) in the form of bored flow channels with attached ports. Two liquid flow channels, FC1, FC2, are conveniently bored in solid pieces or under size tubes. It is essential that the two bores, B1, B2 respectively, are as similar to each other as possible in cross-sectional form and dimension. Bored circular tubes have proved suitable. In one embodiment, for a liquid flow of some 100 to 1,000 ml/minute of conducting liquid, the bores are 1.8 mm diameter in 3 mm diameter material. These values give tolerable pressure drops in liquid flowing through the head. Ports of similarly-bored blocks of PERSPEX (RTM) are shaped to hold the two bored pieces in liquid-tight close, precisely fixed, side-by-side parallel relation as shown. The port blocks PB1, PB2 are shaped to skew the parallel flow channels apart to permit liquid flow connections to be made to the head.

Electrodes are inserted into the plastics material to make contact with liquid flowing through the head. Electrodes EC1, EC2 are inserted in liquid-tight manner through the walls of flow channels FC1, FC2 respectively. Each of these electrodes is a fine stainless steel rod or wire preferably not more than 0.5 mm in diameter and desirably smaller, say 0.2 mm diameter. The electrodes are similarly positioned in a plane AA' perpendicularly transverse of the flow channel alignment and with a radial alignment of the electrodes perpendicular to respective bore axis. The scrap-section of FIG. 1 shows these positions.

Stainless steel tubular stubs are provided as earth electrodes EE11, EE12, EE21, EE22 inserted into the port blocks as shown. These stubs provide both liquid flow connections and electrodes.

In another embodiment shown in FIG. 2 the flowmeter head is made from a heat-resistant glass material. This, if made with suitable control of channel dimensions, can be used as drawn. In particular the proprietary material VERIDIA (RTM), of Chance-Pilkington Ltd, has sufficiently close control of internal dimensions. For example the 3 mm internal diameter is constant within 0.01 mm over lengths adequate for batches of channel pairs to be made. A radial drilling of some 0.5 mm in diameter is made, for example using ultrasonic techniques, to enable the electrode wire to be inserted. The electrodes can be sealed in place using epoxide based resin (e.g. ARALDITE, RTM). As the heat-resistant glass tube is available in quite long lengths, a meter or two at least, long channels can be made. Conveniently these are some 100 mm or so to assist in achieving a stable, non-turbulent flow pattern to improve measurement accuracy. Also the tube can be bent, away from the measurement region, to provide the skew to permit the liquid flow connections to be made. Earth electrodes, or stainless steel or other suitable material, are to be attached at the tube ends, e.g. by being slipped over the tube, to provide electrical connection to the liquid passing through and to provide the liquid flow connections for the flowmeter.

The earthing electrodes may be attached by bonding, e.g. by epoxy resin, or clamping or other suitable means. VERIDIA (RTM) tubing is available in a range of sizes permitting the manufacture of flowmeter heads for a range of flow rates. In FIG. 2 items similar to those in FIG. 1 are indicated by similar references with a "prime" added.

Earthing electrodes of closed loops have been shown but other forms are possible provided that the current path is not distorted.

In use of the flowmeter head liquid flow connections for liquid to be measured, such as renal dialysis fluid or a component of a mixture or other conducting liquid, are applied to each stub and the flowmeter head is positioned in a magnetic flux path directed along the line AA. As is known for electromagnetic flowmeters this field must be as uniform and stable as possible where it passes through the liquid to be measured. A suitable electronic sensing circuit is connected to the flowmeter head, e.g. as in FIG. 3.

The invention as exemplified by the illustrated construction produces advantages in addition to that mentioned above for the magnetic field. Flowmeters used hitherto have an assembly of electrodes in the flux path, usually of opposed electrodes for each flow channel with a connection between them to provide a differential output. The opposed connected electrodes must be small and therefore these together with the connection have a high impedance at the liquid electrode interface. This high impedance in the electrode circuit can cause reduction of signal and phase shifting of the output signal, particularly if the impedance changes with time or liquid conductivity.

In addition to such changes the initial matching of known flowmeter head channels has proved difficult. To cope with varying flows the channel form has to be matched to better than 1%. Rectangular assembled channels cannot reach this accuracy, even at high cost, and electronic compensation techniques, albeit simple ones, have to be employed. The flowmeter heads embodying the invention can provide such accuracies, or better, at reasonable cost using either bored or as-drawn channels. This improved matching accuracy greatly improves the common mode flow rejection with varying flow rates. Longer tubes generally provide better accuracy provided an excessive pressure drop is avoided.

The electrode impedance problem is met by providing the large earth electrodes by which the channels can be coupled instead of using a central coupling electrode or electrodes. These large electrodes have a much lower impedance than those used hitherto, removing or reducing flow rate and conductivity calibration variations. This electrode arrangement avoids earth loops, which cause each channel to act as an electrical load for the other, giving rise to circulating currents affecting base-line stability and differential flow sensitivity.

A further important advantage of the electrode form according to the invention is that the sensitivity is independent of flow velocity profile at the electrode, provided that the velocity profile has radial symmetry.

Eddy current errors are reduced when the flow channels are stacked one above the other as shown in the drawing and any eddy currents are in the same sense.

The disadvantage is a reduction in the basic sensitivity by a factor of one-half compared with the common-electrode form. However this is not necessarily a real penalty as the signal level is still above noise level of available amplifiers and is thus not a real limitation on measurement.

The flowmeter head described above has proved capable of linear measurement of differential flows at least as accurately as the fabricated types used hitherto using which a differential flow of 0.1 ml/minute in a common mode flow of 1,000 ml/minute can be measured to within ±20%. This indicates the possibility of very precise check of inflow against outflow of one liquid, e.g. in renal dialysis. If liquids of different conductivity occur in each flow channel the calibration is held over a wide conductivity range.

Although specifically described in terms of circular bores stacked one above the other in a magnetic flux path other arrangements are possible. The bores may be other shapes, e.g. retangular, and the bores may be side by side so that the flux passes through both at once. However this arrangement can give rise to eddy current problems.

Electrode materials other than stainless steel are suitable, e.g. platinum or platinium black on platinum. The central electrode position is not too critical in angular terms, i.e. those angles whose trigonometrical ratio is substantially constant to two places of decimals. Also provided the flow channel is symmetrical about the magnetic B-axis of the magnetic field path other flow channel forms are possible although the circular one is easy to produce cheaply.

FIG. 3 shows for completeness a block schematic of a circuit suitable for use with flowmeter heads embodying the invention. Such circuits in general are well-known in the art and will not be described in detail except to emphasise the different flowmeter connections resulting from the electrode structure embodying the invention.

The flowmeter head, FH, is positioned in a magnetic flux path MFP. The flux is produced by energizing winding P on core. The liquid flow paths are not shown. The energization for winding P is an alternating current from an amplitude controlled oscillator applied to a power amplifier. The oscillator and amplifier are connected in a control loop with a rectifier and controller effective to control the oscillator to maintain a particular level of energization of winding P, and therefore flux in path MFP, set by the current level demand input which may be a manual or automatic control. Each signal from the pick-up electrodes EC1, EC2 is connected into the input of a differential amplifier with the stub electrodes forming a common earth connection without forming earth loops. The flowmeter heads embodying the invention thus provide an arrangement having improved signal-to-noise ratio and common-mode rejection while reducing drift.

The output of the differential amplifier is amplified in a further amplifier, which may be tuned, and applied to a phase sensitive detector for comparison of phase with a phase reference signal PR which is in phase with the energisation of the flux path MFP. The result of the comparison is an output from the phase sensitive detector proportional to flow difference. Various compensation and correction techniques are applied as shown. The quadrature component is suppressed by applying a suitable cancelling input to the amplifier responsive to the output of the differential amplifier. The output of the phase compensation circuit, which allows for any phase shift between the energising current and the flux, is supplied to a 90° phase shifting circuit to provide a quadrature reference QR for a phase sensitive detector operating in quadrature (90°) with the output signal detector. The output of the quadrature phase sensitive detector is applied as an input to the quadrature suppression circuit to produce the cancelling input for the amplifier.

If required a range of flowmeters can be arranged to control the dilution or mixing of liquids on a continuous basis with high accuracy. Each component or diluent is supplied through one flow channel of a flowmeter controlled or calibrated to supply a specific ratio for the flow in the other channel from an earlier dilution or mixing stage, or start point.

FIG. 4 shows an arrangement using a flowmeter head embodying the invention to control the mixing of two flowing liquids indicated by A and B. A and B may be mixed in a ratio X (preferably not exceeding 10:1). Thus if 10 parts of A are to be mixed with 1 part of B then $x=0.1$.

The two components A and B of the mixture are fed through respective channels of a flowmeter head FH to a mixing area M, which may be a simple junction or of a more complex form if back-flow is to be prevented. The signal from each electrode, EC1, EC2, is fed to a respective differential amplifier DA1, DA2 to produce flow signals FS1, FS2 respectively. Signal FS2 is amplified by factor $1/x$, that is 10 in the above example, and applied to a differential amplifier and controller DAC with signal FS1 itself. So long as the flow of component A is 10 parts to each one of component B the controller DAC is satisfied. If the flow ratio changes however then an error signal from the controller DAC will operate one, or both, of servo valves, SVA, SVB, to adjust the flow of the components to the correct levels. It is considered that 10:1 is the maximum ratio for one stage as signal-to-noise problems may arise with the lower flow rate component at higher ratios. Clearly cascaded stages could be used for a higher final ratio.

The techniques described may also be useful for lower flow rates, e.g. as low as 10 ml/min, as used in chromatography, subject to maintaining an adequate flow speed to produce a signal for relaible measurement. If smaller bores are used, to help to maintain flow speed, closer spacing by reducing wall thickness may improve the magnetic flux conditions by reducing the air gap.

The techniques described above provide improved flowmeter heads and measuring arrangements have high resolution, linearity and stability of measurement of the flow of liquids for medical, industrial and other purposes. The techniques provide flowmeter heads which are economic to produce with a consistent performance, which performance is improved by the earth-loop free electrode arrangement. Specific sizes have been described but clearly other sizes may be used, as appropriate to flow rate and other conditions; also other materials may be more appropriate for some liquids, such as corrosive ones.

We claim:

1. An electromagnetic flowmeter head having a structure of separate liquid flow channels and measuring electrodes the head structure including in inert, non-magnetic insulating material two pairs of inlet and outlet ports linked by respective channel walls providing substantially identical liquid flow channels held close together with a path for magnetic flux across the channels, each of said inlet and outlet ports having an individual earthing electrode outside the flux path position and each of said channels having a single pick-up electrode of a substantially non-magnetic substance extending through the channel wall to the channel periphery, a pick-up electrode of a said channel providing a first electrode connection circuit terminal and the earthing electrodes of the inlet and outlet ports of the said channel providing in common a second electrode connection circuit terminal, whereby in operation an earth-loop free electrode connection circuit is available substantially identical for each channel.

2. A flowmeter head according to claim 1 in which said channels are precision liquid flow channels of bored circular holes in appropriate bore walls of at least one of acrylic plastics, quartz and glass.

3. A flowmeter head according to claim 1 in which said channels are precision channels of drawn quartz tube of adequate precision.

4. A flowmeter head according to claim 1 in which the path for magnetic flux is past one pick-up electrode then the other.

5. A flowmeter head according to claim 1 in which the channels and the pick-up electrodes are side-by-side.

6. A flowmeter according to claim 1 in which the pick up electrodes are 0.2 mm in diameter or thicker.

7. A flowmeter head according to claim 6 in which the pick up electrodes are radial wires 0.5 mm in diameter or thinner.

8. A flowmeter head according to claim 1 in which the channels are between 10 and 100 mm long with said inlet and outlet ports augmenting the length to about 30 to 150 mm overall.

9. A flowmeter head according to claim 8 in which the ports are said earthing electrodes and are of circumferential stainless steel tubular stubs about 3 to 25 mm long.

10. A differential flowmeter arrangement including a head according to claim 1, a magnetic-field source providing a controllable alternating magnetic field along said flux path and indicating means including a differential amplifier responsive to outputs from said pick-up electrodes, with an earth connection to said port electrodes, on the flow of conductive liquid through the flux path in each channel thereby to indicate flow difference or equality.

11. A flowmeter arrangement according to claim 10 to indicate a flow difference, between nominally equal flows in each channel, in the order of 1% of the flow in a channel.

12. A flowmeter arrangement to control the mixing of one, major, liquid commonent with as little as 10% of another, minor, liquid component in a set ratio including a flowmeter head according to any one of claims 1 to 9, means to cause each said component to flow through a control valve and one channel of the head to a mixing point, means to compare a signal representing the major component flow with a signal representing the minor component flow multiplied in said set ratio to produce an error signal to control a said control valve to maintain the set ratio.

* * * * *